United States Patent
Kafuku et al.

(10) Patent No.: US 6,869,131 B2
(45) Date of Patent: Mar. 22, 2005

(54) VEHICLE FRONT END STRUCTURE

(75) Inventors: Kazuaki Kafuku, Kariya (JP); Harumi Okai, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/452,515

(22) Filed: Jun. 2, 2003

(65) Prior Publication Data

US 2004/0041439 A1 Mar. 4, 2004

(30) Foreign Application Priority Data

Jun. 3, 2002 (JP) .................................. 2002-161590

(51) Int. Cl.$^7$ ............................................. B62D 25/08
(52) U.S. Cl. ............................ 296/187.09; 296/193.09; 180/68.4
(58) Field of Search ...................... 296/187.01, 187.03, 296/187.09, 193.01, 193.09, 203.02; 293/115; 280/781; 180/68.4

(56) References Cited

U.S. PATENT DOCUMENTS

| | | | | |
|---|---|---|---|---|
| 5,077,885 A | * | 1/1992 | Kanemitsu et al. | 29/430 |
| 5,155,891 A | * | 10/1992 | Yoshii et al. | 29/430 |
| 5,326,133 A | * | 7/1994 | Breed et al. | 280/735 |
| 5,441,301 A | * | 8/1995 | Breed et al. | 280/735 |
| 6,357,821 B1 | * | 3/2002 | Maj et al. | 296/193.09 |
| 6,450,276 B1 | * | 9/2002 | Latcau | 180/68.4 |
| 6,502,653 B1 | * | 1/2003 | Balzer et al. | 180/68.4 |

FOREIGN PATENT DOCUMENTS

| | | |
|---|---|---|
| JP | 4-63774 | 2/1992 |
| JP | 7-89455 | 4/1995 |
| JP | 11-34920 | 2/1999 |
| JP | 2002-96760 | 4/2002 |

* cited by examiner

*Primary Examiner*—D. Glenn Dayoan
*Assistant Examiner*—Patricia L. Engle
(74) *Attorney, Agent, or Firm*—Harness, Dickey & Pierce, PLC

(57) ABSTRACT

A carrier (1) is secured to a vehicle front end portion via a bracket (4) secured to side members (2) and a bumper reinforcement (3). The connecting portions of the carrier (1) to the bracket (4) are deviated from the side members (2) when viewed from the front side of a vehicle. The bracket (4) is provided with a reinforcing member portion (4a) to connect the left and right side members (2). Accordingly, the action of a large impact force on the carrier (1) can be prevented because only a collision force from the bumper reinforcement (3) acts on the carrier (1) and no reaction force, from the side members, acts on the carrier, when a collision occurs. Therefore, the carrier (1) can be prevented from being broken when a light collision occurs because the attaching portions of the carrier (1) are seldom broken. The rigidity of a vehicle body can be increased by the reinforcing member portion (4a), and the necessary rigidity of the carrier (1) can be reduced. Thus, the weight of the carrier (1) can be reduced.

8 Claims, 6 Drawing Sheets

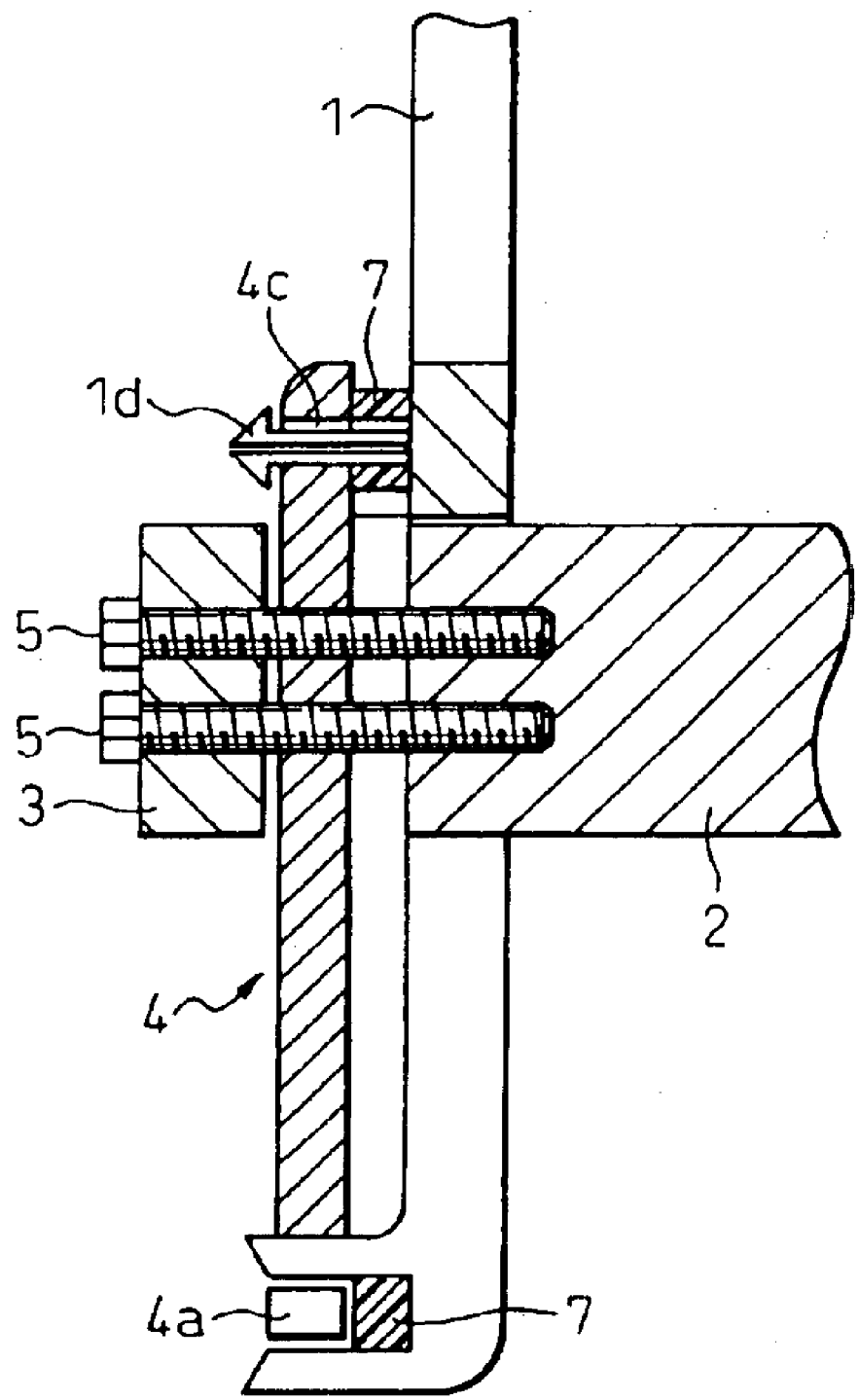

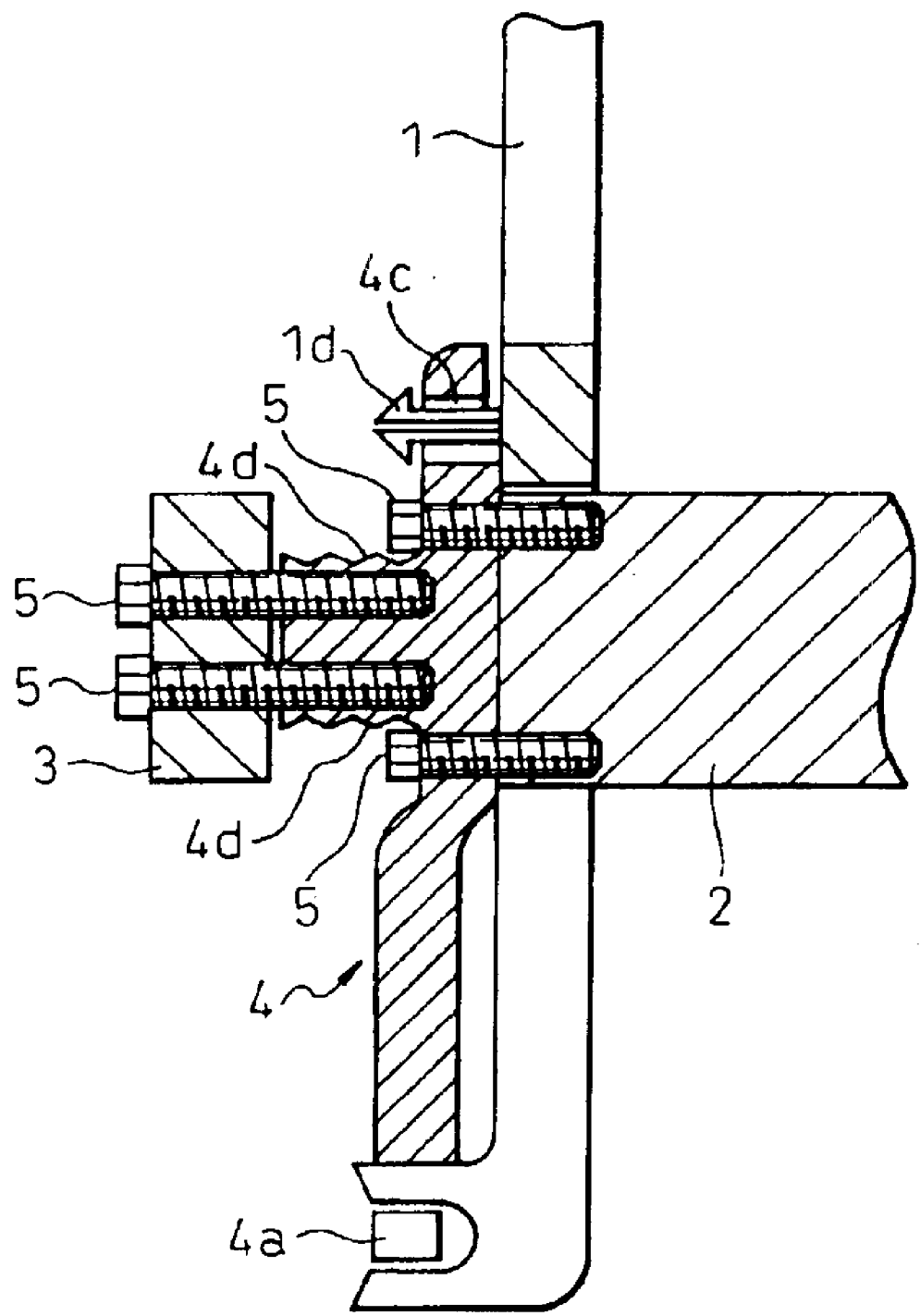

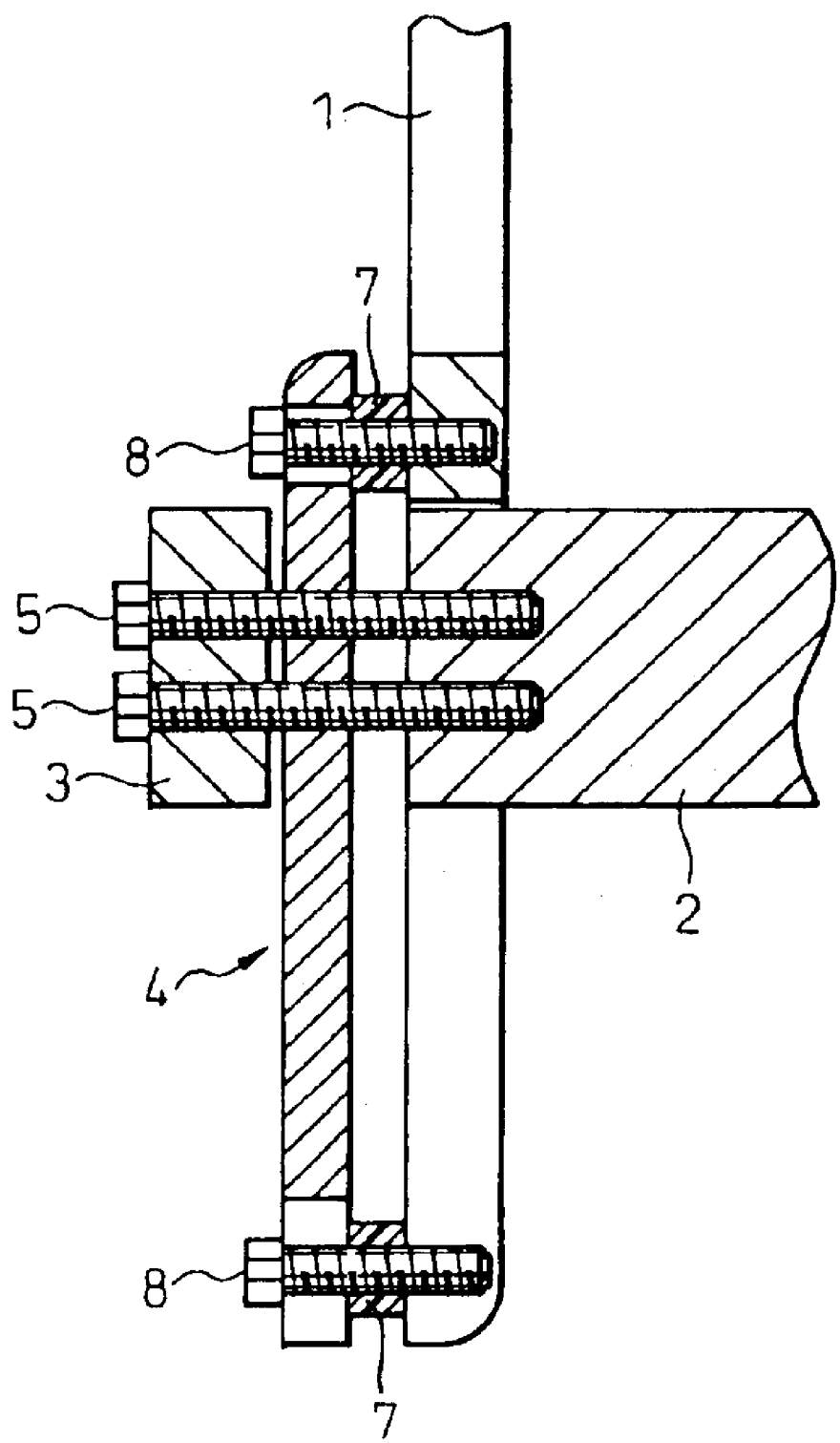

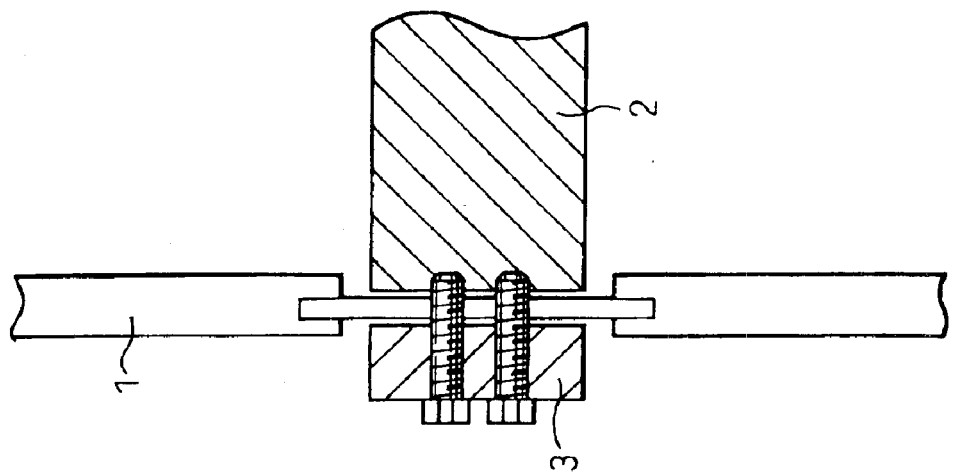
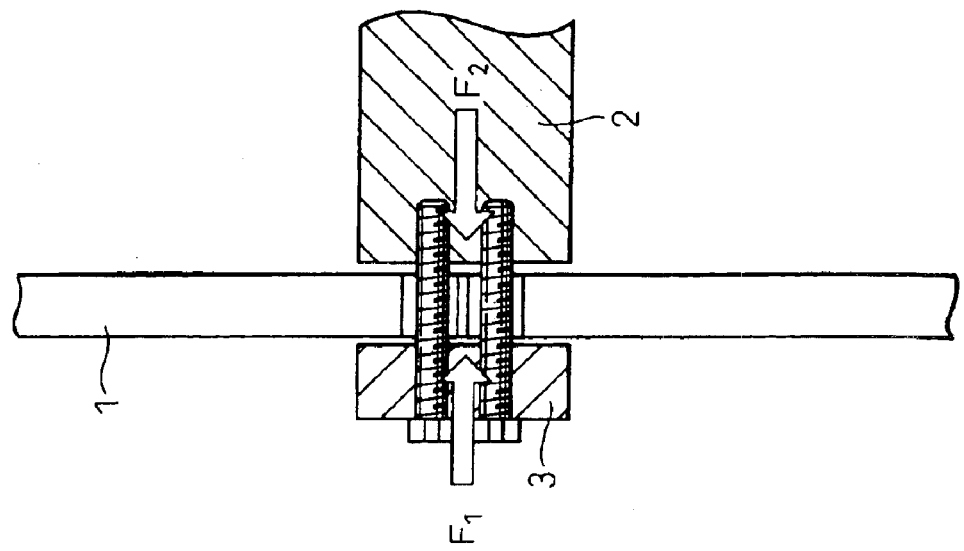

VEHICLE FRONT END STRUCTURE

TECHNICAL FIELD

The present invention relates to a front end structure of a vehicle.

BACKGROUND ART

In a general front end structure of a vehicle, as shown in FIGS. 6A and 6B, a carrier 1 is held between, and secured to, a side member 2 and a bumper reinforcement 3.

In some literature, the carrier is called "front end panel" or "radiator support", and is in the shape of a panel, a beam or a rectangular frame, which extends in a width direction of the vehicle, at the vehicle front end portion. The side members are columnar reinforcing members which are positioned on lateral sides of the vehicle and receive a buckling load. The bumper reinforcement is a beam-like reinforcing member which is positioned at the vehicle front end portion and receives a bending load.

In a conventional structure shown in FIGS. 6A and 6B, the carrier 1 is held between and secured to the side members 2 and the bumper reinforcement 3. Accordingly, when a collision force acts on the vehicle front end side, a collision force F1 from the bumper reinforcement 3 and a reaction force F2 from the side members act on the carrier 1.

Therefore, even when a light collision occurs, a large impact force acts on the carrier. Thus, the attaching portions of the carrier are easily broken.

If the carrier is integral with the attaching portions, it is necessary to replace the entire carrier even when, for example, only the attaching portions are broken. Accordingly, a large repairing cost is incurred even when a light collision occurs.

DISCLOSURE OF THE INVENTION

In view of the above problem, the first object of the present invention is to provide a new vehicle front end structure different from a conventional one, and the second object is to prevent a carrier from being broken when a collision occurs.

To achieve the above objects, the vehicle front end structure according to the present invention is composed of side members (2) that are positioned on the lateral sides of the vehicle and extend in a forward-and-rearward direction of the vehicle, a beam-like bumper reinforcement (3) that is positioned at a vehicle front end portion and extends in the vehicle width direction, and a carrier (1) to which at least a radiator is attached. The carrier (1) is secured to the vehicle front end portion via a bracket (4) secured to at least one of the bumper reinforcement (3) and the side members (2). Connecting portions of the carrier (1) to the bracket (4) are deviated from the side members (2). The bracket (4) is provided with a reinforcing member portion (4a) that connects the left and right side members (2).

Accordingly, when a collision occurs, only a collision force from the bumper reinforcement (3) acts on the carrier (1), and reaction forces from the side members (2) hardly act on the carrier (1).

Therefore, the attaching portions of the carrier (1) are seldom broken because the action of a large impulsive force on the carrier (1) can be prevented when a collision occurs. Accordingly, the carrier (1) is prevented from being broken when a light collision occurs, and a new front end structure of a vehicle different from a conventional front end structure can be obtained. The necessary rigidity of the carrier (1) can be reduced to the rigidity necessary to support a functional component such as a radiator or a condenser because the rigidity of a vehicle body can be increased by the reinforcing member portion (4a). Thus, the weight of the carrier (1) can be reduced.

The numerical references attached in parentheses to the component names described above are given to show an example of correspondence to specific components of embodiments to be described later.

The present invention may be more fully understood from the description of preferred embodiments of the invention set forth below, together with the accompanying drawings.

BRIEF DESCRIPTION OF THE DRAWINGS

FIG. 3 is a sectional view of a second embodiment of a vehicle front end structure according to the present invention;

FIG. 4 is a sectional view of a third embodiment of a vehicle front end structure according to the present invention;

FIG. 5 is a sectional view of a fourth embodiment of a vehicle front end structure according to the present invention; and FIGS. 6A and 6B are sectional views of a conventional vehicle front end structure.

BEST MODE FOR CARRYING OUT THE INVENTION

First Embodiment

Figure 1:
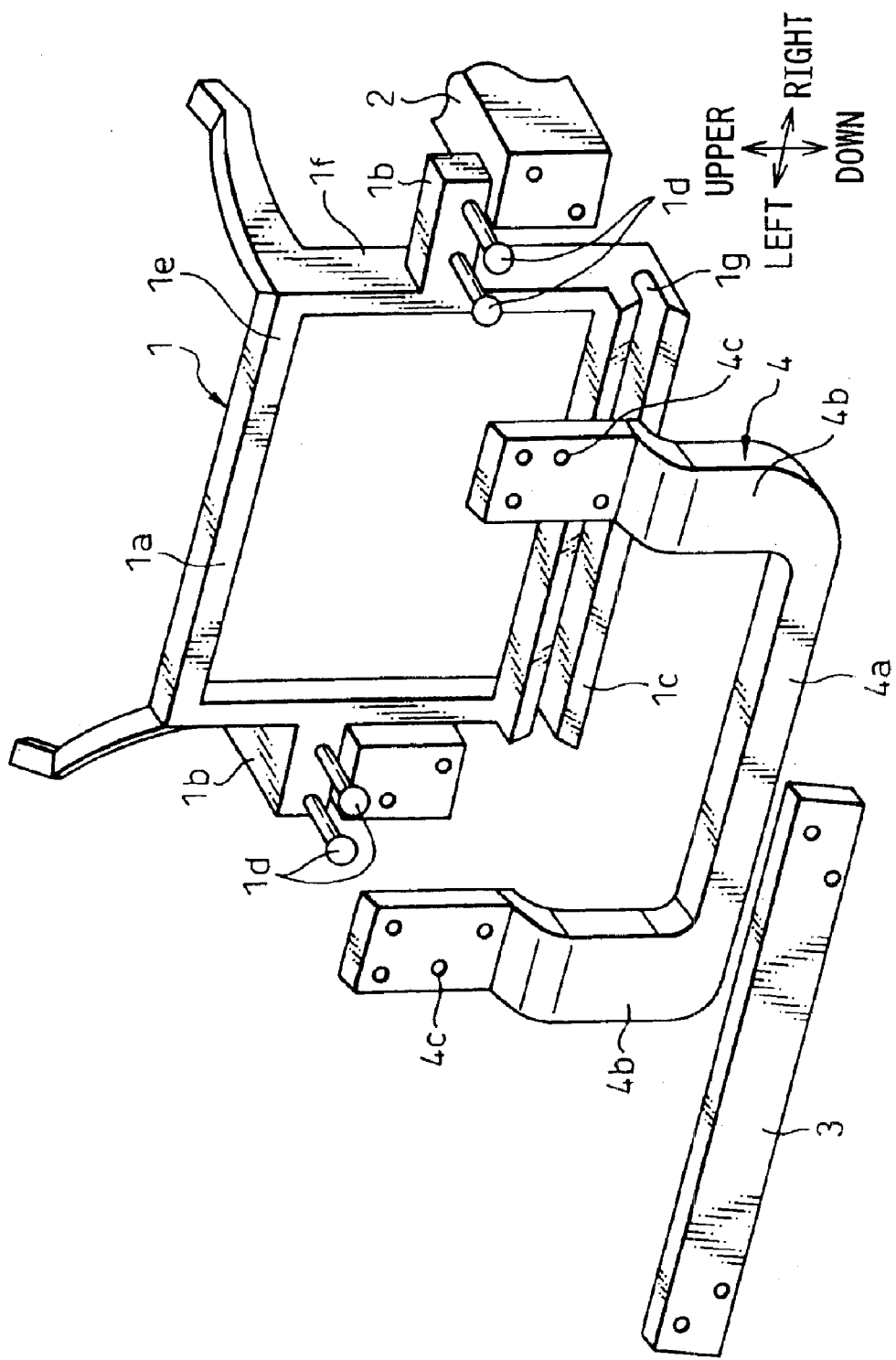
FIG. 1 is an exploded perspective view of a first embodiment of a vehicle front end structure according to the present invention.
Figure 2:
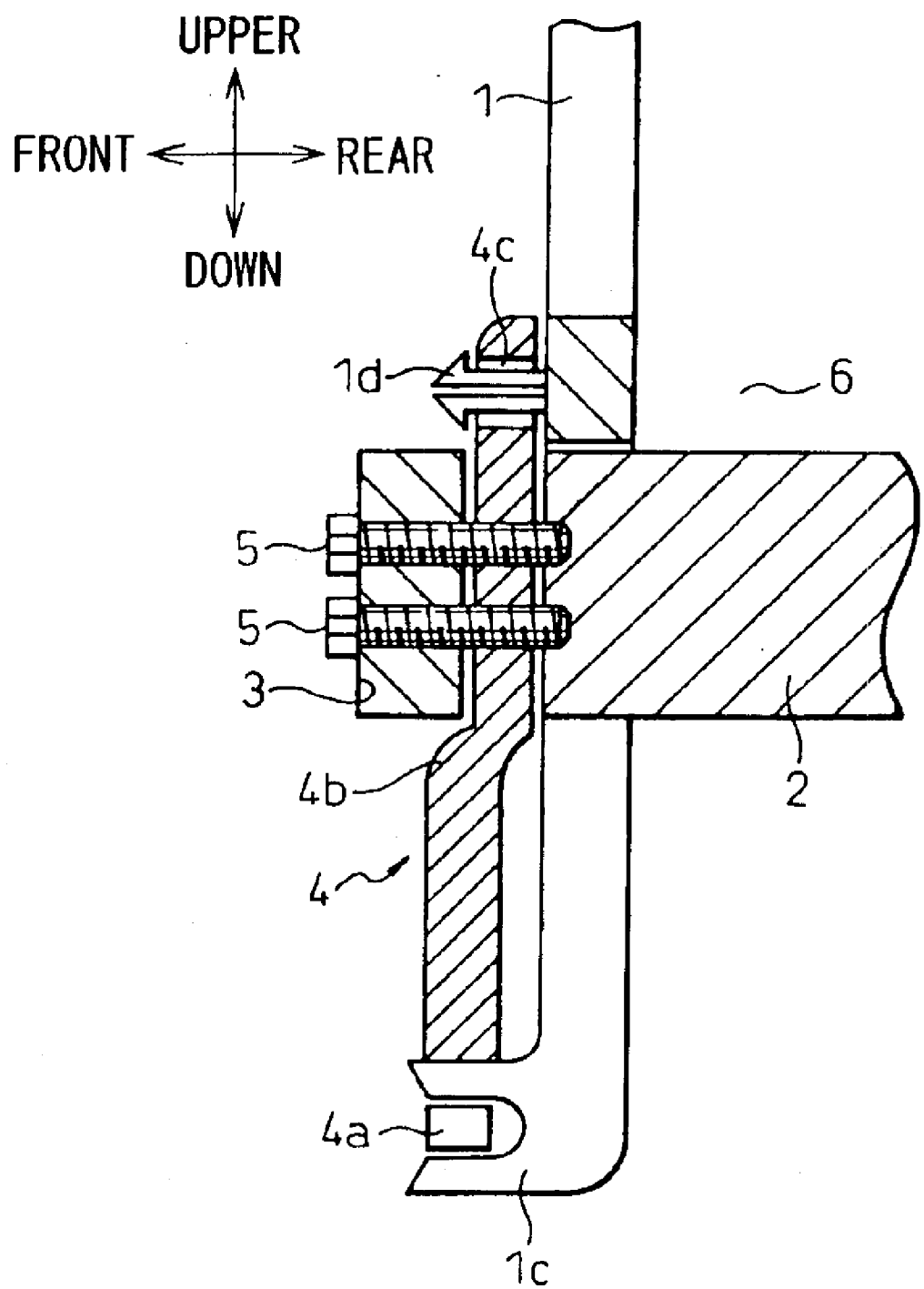
FIG. 2 is a sectional view of a first embodiment of a vehicle front end structure according to the present invention.

FIG. 1 is an exploded perspective view of a vehicle front end structure according to the present embodiment, and FIG. 2 is a sectional view of the vehicle front end structure according to the present embodiment.

A heat exchanger such as a radiator or a condenser and a component mounted to the vehicle front end side, such as a headlight, are attached to a carrier 1. The carrier 1 is an integral unit composed of a carrier main body 1a that functions as a rectangular frame, brackets 1b for attaching the carrier 1 and a shroud for a radiator. A carrier main body 1a is composed of an upper beam portion 1e extending in the vehicle width direction, a lower beam portion 1c and columnar portions 1f for connecting the upper beam portion 1e and the lower beam portion 1c. A groove 1g is formed in the lower beam portion 1c, in a longitudinal direction thereof.

In the present embodiment, the carrier 1 is made of a resin, having a mechanical strength, reinforced by fibers of high tensile strength, such as glass fibers or carbon fibers.

Side members 2 extending in the forward-and-rearward direction of the vehicle are positioned on the lateral sides of the vehicle, and are columnar reinforced members that receive a buckling load occurred by a collision force. A bumper reinforcement 3 extending in the vehicle width direction is positioned at the vehicle front end portion, and is a beam-like reinforced member that receives a bending load occurred by a collision force. The side members 2 and the bumper reinforcement 3 are made of a metal such as aluminum or iron.

As shown in FIG. 1, a bracket 4 is formed substantially in the shape of U, with an opening facing upward, when viewed from the front side of the vehicle. More specifically, the bracket 4 is composed of a reinforcing member portion 4a for reinforcing the lower beam portion 1c of the carrier main body 1a and connecting portions 4b that are positioned at longitudinal ends of the reinforcing member portion 4a and extend in a vertical direction, and is substantially in the shape of U. The reinforcing member portion 4a and connecting portions 4b are integral with each other and are made of a light metal such as aluminum.

As shown in FIG. 2, the connecting portion 4b is held between the side members 2 and the bumper reinforcement 3, and is secured to the side members 2 and the bumper reinforcement 3 by bolts 5 that penetrate through the bumper reinforcement 3 and the securing portion 4b to reach the side members 2.

The reinforcing member portion 4a is fitted in the groove 1g of the lower beam portion 1c, so that the flexural rigidity of the lower beam portion 1c is increased. As the reinforcing member portion 4a is provided at a vehicle lower side, a functional component, such as a heat exchanger, supported by the carrier 1 can be prevented from being broken even if interference with the road surface occurs.

The carrier 1 is secured to the connecting portions 4b of the bracket 4 via snap fits 1d. The connecting portions of the bracket 4 to the carrier 1, on which the snap fits 1d are provided, are provided at positions upwardly deviated from the side members 2 when viewed from the front side of the vehicle.

The snap fits 1d are fastening means which utilize the elastic deformation of their protrusion shaped like a hook, to detachably secure the carrier 1 to the bracket 4. Specifically, the hook-like portions formed on the ends of the snap fits 1d are inserted into holes 4c formed in the securing portions 4b, to engage and secure the carrier 1 to the bracket 4.

Operations and effects of the present embodiment will be described below.

The carrier 1 is secured to the vehicle front end portion via the bracket 4 secured to the side members 2 and the bumper reinforcement 3, and the connecting portions between the carrier 1 and the bracket 4 are deviated from the side members 2 when viewed from the front side of the vehicle. Accordingly, only collision force from the bumper reinforcement 3 acts on the carrier 1, and no reaction force from the side members 2 acts on the carrier 1, when a collision occurs.

Therefore, the attaching portions of the carrier 1 are seldom broken because the action of a large impact force on the carrier 1 can be prevented when a collision occurs. Accordingly, the carrier 1 can be prevented from being broken when a light collision occurs.

In the present embodiment, a space 6 (see FIG. 2), in which the carrier 1 can move toward the rear of the connecting portions of the carrier 1 to the bracket 4, is provided, so that a collision force from the bumper reinforcement 3 received by the carrier 1 can be reliably absorbed when a collision occurs.

If the breakage of the carrier 1 due to a collision occurs, only carrier 1 can be easily replaced because the carrier 1 is secured to the bracket 4 by the snap fits 1d.

In the present embodiment, in order to remove the carrier 1 from a vehicle, the carrier 1 is moved toward the rear side of the vehicle, to disengage the snap fits 1d, and then the carrier 1 is moved upwardly.

The lower beam portion 1c of the carrier main body 1a requires a large flexural rigidity because a vibration applying force according to the weight and vibration of an engine, acts on the lower beam portion 1c.

Contrary to this, in the present embodiment, the flexural rigidity of the lower beam portion 1c is increased by the reinforcing member portion 4a. Therefore, the rigidity of the lower beam portion 1c can be increased without increasing the weight of the carrier 1.

Second Embodiment

As shown in FIG. 3, in the present embodiment, a cushioning member 7 for absorbing an impact force is provided at contact points between the carrier 1 and the bracket 4.

The cushioning member 7 is made of a material, that is more easily broken than the bumper reinforcement 3 or the bracket 4 made of resin or the like, such as an elastic material having spring characteristics or a material having a shape to exhibit spring characteristics.

Third Embodiment

As shown in FIG. 4, in the present embodiment, a cushioning portion 4d for absorbing a collision force is provided on the surface of the bracket 4 opposite to the bumper reinforcement 3.

It is needless to say that a cushioning member, such as a crush box, for absorbing a collision force may be held between the bumper reinforcement 3 and the bracket 4.

Forth Embodiment

In the above-described embodiments, the snap fits 1d are adopted as fastening means that detachably secure the carrier 1 to the bracket 4. However, in the present embodiment, as shown in FIG. 5, bolts 8 are adopted as fastening means.

In FIG. 5, the present embodiment is applied to the second embodiment (FIG. 3). However, the present embodiment is not limited to this. It is needless to say that the present embodiment may be applied to the first embodiment (FIG. 2) and the third embodiment (FIG. 4).

Another Embodiment

In the above-described embodiments, the carrier 1 is secured to the bracket 4 by detachable fastening means (snap fits 1d, bolts 8). However, the present invention is not limited to this. The carrier 1 may be secured to the bracket 4 by a method, such as welding or bonding, in which the carrier and the bracket cannot be disassembled.

In the above-described embodiments, the bracket 4 is held between the side member 2 and the bumper reinforcement 3, and is secured to the side member 2 and the bumper reinforcement 3 by bolts 5 that penetrate through the bumper reinforcement 3 and the connecting portions 4b to reach the side members 2. However, the present invention is not limited to this.

In the above-described embodiments, the connecting portions of the carrier 1, to the bracket 4, are provided at positions upwardly deviated from the side members 2, when viewed from the front side of the vehicle. However, the present invention is not limited to this. For example, the connecting portions of the carrier 1 to the bracket 4 may be downwardly deviated from the side members 2.

While the invention has been described by reference to specific embodiments chosen for purposes of illustration, it should be apparent that numerous modifications could be made thereto by those skilled in the art without departing from the basic concept and scope of the invention.

What is claimed is:

1. A front end structure of a vehicle, comprising
   side members (2) that are positioned on lateral sides of the vehicle and extend in a forward-and-rearward direction of the vehicle;
   a beam-like bumper reinforcement (3) that is positioned at a vehicle front end portion and extends in a width direction of the vehicle; and
   a carrier (1) to which at least a radiator is attached, wherein
   the carrier (1) is releasably secured to the vehicle front end portion via a bracket (4) which is secured to at least one of the bumper reinforcement (3) and the side members (2);
   connecting portions of the carrier (1), to the bracket (4), are deviated from the side members (2), when viewed from the front side of the vehicle, and the bracket (4) is provided with a reinforcing member portion (4a) to connect the left and right side members (2); and
   the connecting portions of the carrier (1) detachably fastens the carrier (1) to the bracket (4) by using elastic deformation.

2. A front end structure of a vehicle according to claim 1, wherein the reinforcing member portion (4a) is provided on a vehicle lower end side.

3. A front end structure of a vehicle according to claim 1, wherein the bracket (4) is substantially in the shape of U, with an opening facing upward, when viewed from the front side of the vehicle.

4. A front end structure of a vehicle according to claim 1, wherein
   the bracket (4) is held between the side members (2) and the bumper reinforcement (3) and is secured to the side members (2) and the bumper reinforcement (3).

5. A front end structure of a vehicle according to claim 1, wherein
   a space (6), in which the carrier (1) can move, is provided at the rear of the connecting portions of the carrier (1) to the bracket (4).

6. A front end structure of a vehicle according to claim 1, wherein
   the connection of the carrier (1) and the bracket (4) and the connection of the bumper reinforcement (3), the bracket (4) and the side member (2) are carried out by fastening means from the vehicle front side.

7. A front end structure of a vehicle, comprising
   side members (2) that are positioned on lateral sides of the vehicle and extend in a forward-and-rearward direction of the vehicle;
   a beam-like bumper reinforcement (3) that is positioned at a vehicle front end portion and extends in a width direction of the vehicle; and
   a carrier (1) to which at least a radiator is attached, wherein
   the carrier (1) is releasably secured to the vehicle front end portion via a bracket (4) which is secured to at least one of the bumper reinforcement (3) and the side members (2);
   connecting portions of the carrier (1), to the bracket (4), are deviated from the side members (2), when viewed from the front side of the vehicle, and the bracket (4) is provided with a reinforcing member portion (4a) to connect the left and right side members (2);
   the carrier (1) comprises an upper beam portion (1e) and a lower beam portion (1c), that extend in the vehicle width direction, and a columnar portion (1f) connecting the upper beam portion (1e) and the lower beam portion (1c),
   a groove (1g) is formed in the lower beam portion (1c); and
   the reinforcing member portion (4a) is fitted in the groove (1g) of the lower beam portion (1c).

8. A front end structure of a vehicle according to claim 7, wherein the groove (1g) of the lower beam portion (1c) is opened toward the front side of the vehicle.

* * * * *